United States Patent
Bhudavaram et al.

(10) Patent No.: US 12,047,412 B2
(45) Date of Patent: Jul. 23, 2024

(54) CONTEXT-BASED SIMULATION OF CONTENT

(71) Applicant: International Business Machines Corporation, Armonk, NY (US)

(72) Inventors: Dinesh Kumar Bhudavaram, Bangalore (IN); Hemant Kumar Sivaswamy, Pune (IN); Raghuveer Prasad Nagar, Kota (IN); Vinod A. Valecha, Pune (IN)

(73) Assignee: International Business Machines Corporation, Armonk, NY (US)

( * ) Notice: Subject to any disclaimer, the term of this patent is extended or adjusted under 35 U.S.C. 154(b) by 79 days.

(21) Appl. No.: 17/124,816

(22) Filed: Dec. 17, 2020

(65) Prior Publication Data

US 2022/0201034 A1 Jun. 23, 2022

(51) Int. Cl.
*H04L 29/00* (2006.01)
*G06F 18/2431* (2023.01)
*H04L 9/40* (2022.01)

(52) U.S. Cl.
CPC ...... *H04L 63/1483* (2013.01); *G06F 18/2431* (2023.01)

(58) Field of Classification Search
CPC ............................ H04L 63/1483; G06K 9/628
USPC ........................................................ 726/22
See application file for complete search history.

(56) References Cited

U.S. PATENT DOCUMENTS

| 9,317,680 | B2* | 4/2016 | Carter, III | G06F 16/951 |
| 2006/0010258 | A1* | 1/2006 | Zare | G06F 11/3604 710/1 |
| 2007/0039038 | A1* | 2/2007 | Goodman | H04L 63/1483 726/2 |
| 2018/0344242 | A1* | 12/2018 | Ben-Kiki | A61B 5/4833 |

FOREIGN PATENT DOCUMENTS

| CN | 103221959 A | 7/2013 |
| CN | 103023905 B | 12/2015 |
| CN | 108171049 A | 6/2018 |
| WO | 2014094653 A1 | 6/2014 |

OTHER PUBLICATIONS

"Shortened URL Security", © 2020 The Regents of the University of Michigan, 3 pages, <https://safecomputing.umich.edu/be-aware/phishing-and-suspicious-email/shortened-url-security>.
Stembert et al., "A Study of Preventing Email (Spear) Phishing by Enabling Human Intelligence", 2015 European Intelligence and Security Informatics Conference, DOI 10.1109/EISIC.2015.38, 8 pages.

(Continued)

*Primary Examiner* — Brandon Hoffman
*Assistant Examiner* — Michael D Anderson
(74) *Attorney, Agent, or Firm* — Michael A. Petrocelli (57) ABSTRACT

Embodiments of the present invention provide methods, computer program products, and systems. Embodiments of the present invention can in response to receiving content, dynamically determining validity of received content. Embodiments of the present invention can then, in response to an determining the validity of received content, altering the received content prior to transmitting the received content to a user.

20 Claims, 4 Drawing Sheets

(56) References Cited

OTHER PUBLICATIONS

Blair, Evan, "4 Ways to Avoid Malicious Links on Social Media", InformationWeek, Nov. 6, 2014, 6 pages, <https://www.informationweek.com/software/social/4-ways-to-avoid-malicious-links-onsocial-media/a/d-id/1317250>.
Hu, Hang, "Characterizing and Detecting Online Deception via Data-Driven Methods", May 8, 2020, 207 pages.
Vigliarolo, Brandon, "How to prevent phishing attacks in Microsoft Outlook and Office 365: 3 methods", Aug. 16, 2017, 11 pages.
Laing, Brian, "Protection from Malicious Links", Sep. 22, 2017, 3 pages, <https://www.lastline.com/blog/protection-from-malicious-links/>.
Jain et al., "Phishing Detection: Analysis of Visual Similarity Based Approaches", Published Jan. 10, 2017, 21 pages.
Liu et al., "Web malware spread modelling and optimal control strategies", Scientific Reports, Published: Feb. 10, 2017, DOI: 10.1038/srep42308, 19 pages.

\* cited by examiner

CONTEXT-BASED SIMULATION OF CONTENT

BACKGROUND

The present invention relates in general to audio emulation, and in particular to preventing access to suspicious content via context-based simulation of content associated with received media on one or more Internet of Things (IoT) devices.

Phishing generally refers to fraudulent attempts to obtain sensitive information or data, such as usernames, passwords and credit card details, by disguising oneself as a trustworthy entity in an electronic communication. Phishing is typically implemented using email spoofing, instant messaging, and text messaging. Content in phishing communication directs users (e.g., via some media such as a web link or image) to enter personal information at a fake website which matches the look and feel of the legitimate site.

Social networking spam can include phishing characteristics and refers to spam that is directed specifically at users of internet social networking services. Typically, social networking spam can utilize the social network's search tools to target certain demographic segments or use common fan pages or groups to send notes from fraudulent accounts. Social spam thus, can be generally defined as unwanted spam content appearing on social networking services, social bookmarking sites and any website with user-generated content (e.g., comments, chat, links, pictures, audio, etc.). Such content can include notes or messages that contain embedded links to malicious or unwanted content. In response to this, many social networks have included a mechanism to report fictitious accounts sending malicious or unwanted content.

SUMMARY

According to an aspect of the present invention, there is provided a computer-implemented method. The method comprises in response to receiving content, dynamically determining validity of received content; and in response to an determining the validity of received content, altering the received content prior to transmitting the received content to a user.

BRIEF DESCRIPTION OF THE DRAWINGS

Preferred embodiments of the present invention will now be described, by way of example only, with reference to the following drawings, in which.

DETAILED DESCRIPTION

Embodiments of the present invention recognize deficiencies in current spam filtering systems. Specifically, embodiments of the present invention recognize that current spam filtering systems lack comprehensive ways to filter unwanted or malicious content. For example, traditional spam filtering systems focus as an add-on application within existing electronic mail systems and typically include techniques such as user discretion, address munging, contact forms, a blanket disabling of HTML in email, enforcement of Request For Comments (RFC) standards. Accordingly, embodiments of the present invention improve current spam filtering systems using context-based simulation of content, prior to displaying content or blocking content. In this manner, as described in greater detail, embodiments of the present invention can verify or otherwise validate received content prior to presenting content (e.g., transmitting content) or blocking content to an end user. Some embodiments of the present invention can further classify users and display customized messages for simulated content based on the classification, as discussed in greater detail later in this Specification.

Figure 1:
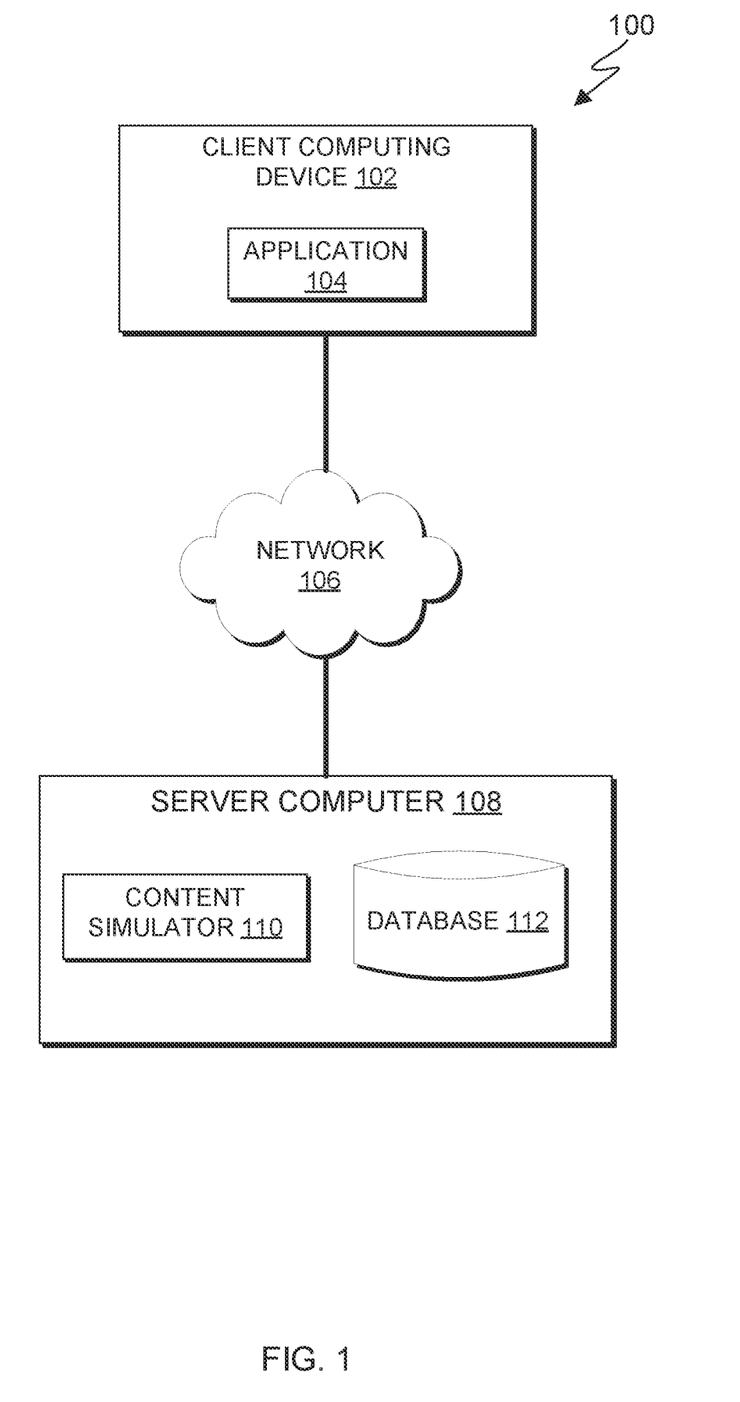
FIG. 1 depicts a block diagram of a computing environment, in accordance with an embodiment of the present invention.

FIG. 1 is a functional block diagram illustrating a computing environment, generally designated, computing environment 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computing environment 100 includes client computing device 102 and server computer 108, all interconnected over network 106. Client computing device 102 and server computer 108 can be a standalone computer device, a management server, a webserver, a mobile computing device, or any other electronic device or computing system capable of receiving, sending, and processing data. In other embodiments, client computing device 102 and server computer 108 can represent a server computing system utilizing multiple computer as a server system, such as in a cloud computing environment. In another embodiment, client computing device 102 and server computer 108 can be a laptop computer, a tablet computer, a netbook computer, a personal computer (PC), a desktop computer, a personal digital assistance (PDA), a smart phone, or any programmable electronic device capable of communicating with various components and other computing devices (not shown) within computing environment 100. In another embodiment, client computing device 102 and server computer 108 each represent a computing system utilizing clustered computers and components (e.g., database server computers, application server computers, etc.) that act as a single pool of seamless resources when accessed within computing environment 100. In some embodiments, client computing device 102 and server computer 108 are a single device. Client computing device 102 and server computer 108 may include internal and external hardware components capable of executing machine-readable program instructions, as depicted and described in further detail with respect to FIG. 4.

In this embodiment, client computing device 102 is a user device associated with a user and includes application 104. Application 104 communicates with server computer 108 to access content simulator 110 (e.g., using TCP/IP) to access content, user information, and database information. Application 104 can further communicate with content simulator 110 to transmit instructions to determine the validity of received content by simulating received content prior to delivering received content to a user as discussed in greater detail with regard to FIGS. 2-3.

Network 106 can be, for example, a telecommunications network, a local area network (LAN), a wide area network (WAN), such as the Internet, or a combination of the three, and can include wired, wireless, or fiber optic connections. Network 106 can include one or more wired and/or wireless networks that are capable of receiving and transmitting data, voice, and/or video signals, including multimedia signals that include voice, data, and video information. In general, network 106 can be any combination of connections and protocols that will support communications among client computing device 102 and server computer 108, and other computing devices (not shown) within computing environment 100.

Server computer 108 is a digital device that hosts content simulator 110 and database 112. In this embodiment, content simulator 110 resides on server computer 108. In other embodiments, content simulator 110 can have an instance of the program (not shown) stored locally on client computing device 102. For example, content simulator 110 can be integrated with an existing filtering (e.g., spam filtering/spam application) installed on a client device. In other embodiments, content simulator 110 can be a standalone program or system that provides context-based validation of received content prior to displaying or blocking received content. In yet other embodiments, content simulator 110 can be stored on any number or computing devices.

In this embodiment, content simulator 110 provides context-based validation of received content prior to displaying or blocking received content. In this embodiment, content simulator 110 can include a simulation module (not shown) and a prediction module (also not shown).

Content, as used herein, refers to one or more messages containing media. Content can include one or more textual information, pictorial, audio, visual, and graphic information. Content can also include one or more files and extensions (e.g., file extensions such as .doc, .docx, .odt, .pdf, .rtf.txt, .wpd, etc. Content can further include audio (e.g., .m4a, .flac, .mp3, .mp4, .wave .wma, etc.) and visual/images (e.g., .jpeg, .tiff, .bmp, .pdf, .gif etc.). Content can also include one or more Uniform Resource Locators (URLs) or one or more URLs embedded within textual, pictorial, audio, visual, and graphic information.

Content simulator 110 can receive content from one or more other sources. Prior to either transmitting the received content to a user or blocking the received content (e.g., not transmitting the received content to the user), content simulator 110 can validate the received content. In this embodiment, content simulator 110 validates the received content by simulating the received content using one or more combinations of real time internet searches, validating the received content against a master database, or on the fly simulations, as described in greater detail with respect to FIGS. 2 and 3.

In some embodiments, content simulator 110 can assign a risk score to the received content. In this embodiment the assigned risk score is used to classify the user into three categories: low risk, medium risk, high risk. In this embodiment, a numeric scale is used where greater numbers indicate higher values (e.g., risk) and lesser numbers indicate less risk. For example, using a scale of one through ten, a score ranging from zero to three would indicate a low risk, a score ranging from four to seven would indicate a medium risk and a score ranging from eight to ten would indicate a high risk. A low risk score can mean potentially wanted or otherwise harmless content. Conversely a high risk score could mean either an unwanted or harmful (e.g., malicious content). A medium risk score could mean unwanted but otherwise harmless content.

Content simulator 110 can then alter the received content based on the validation and take one or more other actions based on a user's profile. In this embodiment, an action can include either transmitting and subsequently displaying the received content or blocking or otherwise preventing transmission and subsequent display of the received content to an end user. For example, in response to a successful validation (e.g., that the content is wanted or does not contain malicious content), content simulator 110 can transmit or otherwise display the received content to the user. In response to an unsuccessful validation, content simulator 110 can block or otherwise prevent transmission to and subsequent display of received content. An action can further include altering the received content (e.g., deprecating a received link and generating a customized message for the user).

In either circumstance, some embodiments of the present invention can generate customized messages based on a respective user's profile. In this embodiment, content simulator 110 can generate customized messages (and subsequently attach the generated customized messages to respective users) using both the user's profile and the results of the validation. In instances where a user does not have an accessible user profile, content simulator 110 can create a user profile.

In this embodiment, content simulator 110 can generate a user profile based on user activity. For example, content simulator 110 can, with permissioned access from the user (e.g., via an opt-in/opt-out mechanism), monitor user activity on one or more user devices to identify types of activity (e.g., content accessed) and applications (e.g., browsers, programs, etc.) used by the user, frequency of use by the user and other patterned user behavior (e.g., user defined terms, frequently used words, etc.).

In this embodiment, content simulator 110 can generate a score assigned to the user to indicate a user's technical preferences based on the user profile using one or more combinations of machine learning and artificial intelligence algorithms. In this embodiment, content simulator 110 can correlate a user's complexity of features within an application as being indicative of technical ability. For example, content simulator 110 can identify based on the user's activity and profile that the user may use a particular device infrequently (e.g., up to three times per week), sends typed or text content in frequently, and generally speaks and receive text in a particular language, content simulator 110 can assign the user a score indicating that the user may prefer less technical information and infrequent notifications. Conversely, content simulator 110 can assign the user a score indicate the user prefers or is open to receiving more technical information based on user activity that shows the user reading technical or educational content, navigation patterns through applications, frequency and duration of use. Content simulator 110 can continually update the created user profiles and scores.

Content simulator 110 generates a customized message for the user each time content is received and transmits or otherwise displays the customized message for the user regardless of the results of the validation. For example, in response to an unsuccessful validation (e.g., a high risk), content simulator 110 can generate identify a user's technical preferences (e.g., wanting to receive more information when an unsuccessful validation is made). In response to determining that a user is technically savvy (based on user activity), content simulator 110 can generate message for the blocked block or otherwise prevented transmission of the received content that includes a disabled text link, content type (e.g., designation as malicious such as a virus and the name of the virus), risk score or category (e.g., on the scale of one to ten, with ten being the highest), number of users affected (e.g., 25,000 users), and user device status (e.g., safe, no action required). to and subsequent display of received content.

In another example, where content simulator 110 determines a medium risk score, and that the user prefers more technical information, content simulator 110 can display a disabled link and textual content received and transmit the following message that includes: content type (e.g., personalized greeting message), content (e.g., Happy New Year, Sam), risk category (e.g., four), number of people affected (e.g., 15,000 users received this message), and device status (e.g., safe, no action required). Optionally, based on user preferences, where content simulator 110 determines a medium risk (e.g., non-malicious but potentially unwanted content and thus a successful verification based on user preferences to be less restrictive), content simulator 110 can display the received content.

Conversely, where content simulator 110 determines a high risk score and that the user prefers less technical information, content simulator 110 can display the received content (e.g., the virus link) and a message to the user stating, "this message was not meant for you was deleted"). In instances where content simulator 110 determines a medium risk score, and that the user prefers less technical information, content simulator 110 can display the disabled link, message (e.g., Happy New Year, Sam) and indicate its origin (e.g., a random website).

Content simulator 110 can, in some embodiments, tag content with details for future content forwarding. For example, content simulator 110 can tag the content based on content type (e.g., spam, malicious link, etc.), potential consequences of interacting with unwanted or malicious links, number of users sent this content (e.g., 25,000 users were sent this content), number of users affected (e.g., 1,000 users interacted with the link), etc.

In some embodiments content simulator 110 can be integrated as part of an augmented or virtual reality system. For example, content simulator 110 can be integrated into augmented reality devices (e.g., goggles) to view the impact of malicious content and to provide audible (e.g., voice) feedback.

Database 112 stores received information and can be representative of one or more databases that give permissioned access to content simulator 110 or publicly available databases. In general, database 112 can be implemented using any non-volatile storage media known in the art. For example, database 112 can be implemented with a tape library, optical library, one or more independent hard disk drives, or multiple hard disk drives in a redundant array of independent disk (RAID). In this embodiment database 112 is stored on server computer 108.

Figure 2:
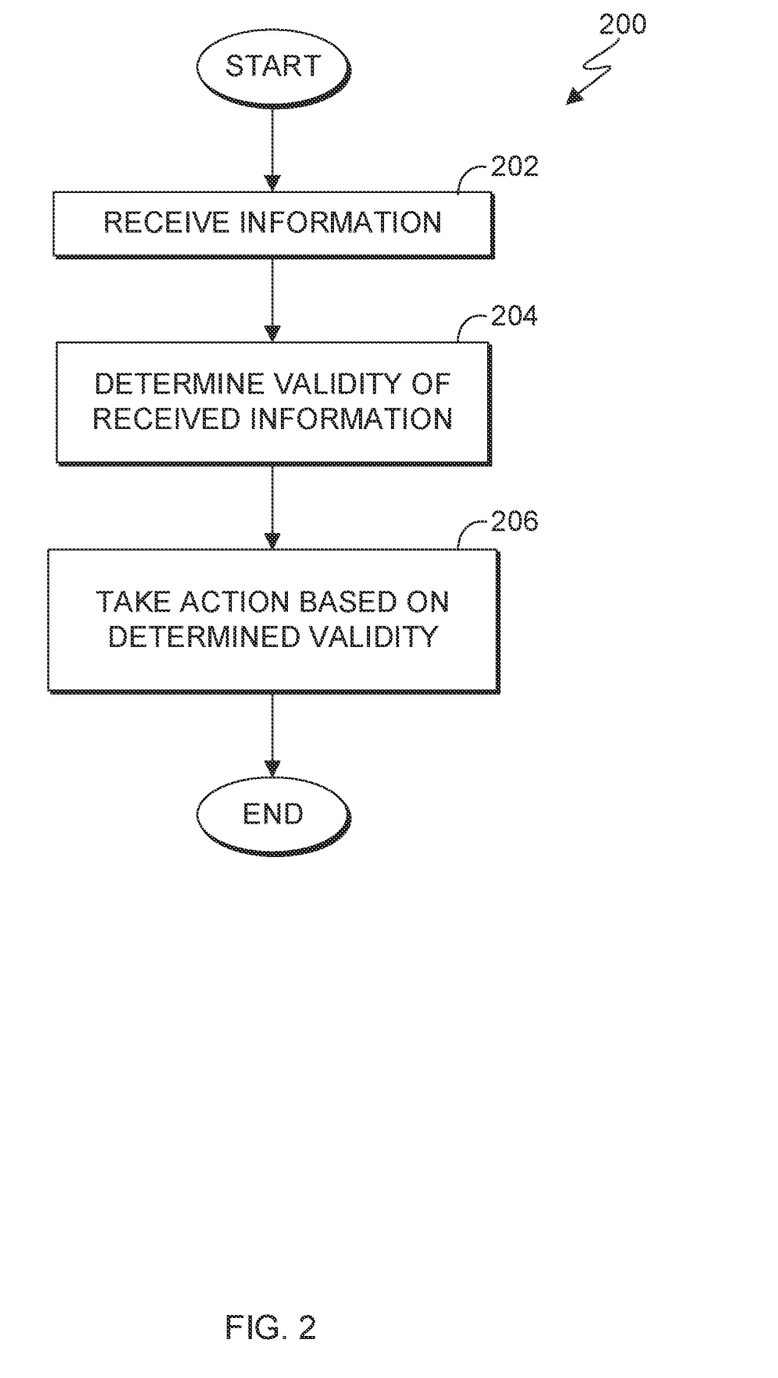
FIG. 2 is a flowchart depicting operational steps for context-based simulation of received content to prevent unintended access to malicious content, in accordance with an embodiment of the present invention.

FIG. 2 is a flowchart 200 depicting operational steps for context-based simulation of received content to prevent unintended access to malicious content, in accordance with an embodiment of the present invention.

In step 202, content simulator 110 receives information. In this embodiment, content simulator 110 receives a request from client computing device 102. In other embodiments, content simulator 110 can receive information from one or more other components of computing environment 100.

In this embodiment, information can include content intended for a user (e.g., via email, messaging application, user device, etc.). As mentioned earlier, content refers to one or more messages containing media. Content can include one or more textual information, pictorial, audio, visual, and graphic information. Content can also include one or more files and extensions (e.g., file extensions such as .doc, .docx, .odt, .pdf, .rtftxt, .wpd, etc. Content can further include audio (e.g., .m4a, .mp3, .mp4, .wave .wma, etc.) and visual/images (e.g., .jpeg, .tiff, .bmp, .pdf, .gif etc.). Content can also include one or more Uniform Resource Locators (URLs) or one or more URLs embedded within textual, pictorial, audio, visual, and graphic information.

For example, received information can include an email sent to fifty recipients of an email service, each recipient having the same birthday. The content of the email contains textual information (e.g., text stating happy birthday), graphics (e.g., a gif depicting balloons), and a URL leading to a website.

Information can also include user activity. For example, information can include permissioned access from the user (e.g., via an opt-in/opt-out mechanism), used to monitor user activity on one or more user devices to identify types of activity (e.g., content accessed) and applications (e.g., browsers, programs, etc.) used by the user, frequency of use by the user and other patterned user behavior (e.g., user defined terms, frequently used words, etc.) in order to create or refine a user profile as discussed in greater detail with regard to FIG. 3.

In step 204, content simulator 110 determines validity of the received information. In this embodiment, content simulator 110 determines the validity of received information (e.g., content) by simulating the received content, server side. For example, content simulator 110 can use one or more combinations of real time internet searches (e.g., to access a received weblink and identify potential problems). Content simulator 110 can validate the received content (e.g., a weblink) against a master database to identify positive matches for malicious or spam content. Content simulator 110 can also validate the received content using on the fly simulations.

Continuing the above example (e.g., the email sent to fifty email users of an email service), content simulator 110 simulates the received content and identifies that content of the email. In this example, content simulator 110 identifies, using natural language processing techniques, that the email contains a message stating, "happy birthday". Content simulator 110 further identifies that the email also includes a web link that, when interacted with, takes a user to a website that collects personal information (e.g., date of birth, account numbers, etc.).

In some other embodiments, content simulator 110 can assign a risk score to the received content. In this embodiment the assigned risk score is used to classify the user into three categories: low risk, medium risk, high risk. In this embodiment, a numeric scale is used where greater numbers indicate higher values (e.g., risk) and lesser numbers indicate less risk. For example, using a scale of one through ten, a score ranging from zero to three would indicate a low risk, a score ranging from four to seven would indicate a medium risk and a score ranging from eight to ten would indicate a high risk. A low risk score can mean potentially wanted or otherwise harmless content. Conversely a high risk score could mean either an unwanted or harmful (e.g., malicious content). A medium risk score could mean unwanted but otherwise harmless content.

In yet other embodiments, content simulator 110 can refine the assigned risk score based on a user's social media contacts. For example, where content simulator 110 identifies that a user's contact (e.g., friend) has also received the weblink, accessed it, and has had no issue, content simulator 110 can modify the assigned risk score to lower the assigned risk score. Conversely, where content simulator 110 identifies that the user's contact has had an adverse response to (e.g., either unwanted or included malicious content), content simulator 110 can increase the assigned risk score).

In step 206, content simulator 110 takes action based on the determined validity and a user's profile. As mentioned above, an action can include either transmitting and subsequently displaying the received content, blocking or otherwise preventing transmission and subsequent display of the received content to an end user, and generating a respective, customized message based on the validation. For example, in response to a successful validation (e.g., that the content is wanted or does not contain malicious content), content simulator 110 can transmit or otherwise display the received content to the user. In response to an unsuccessful validation, content simulator 110 can block or otherwise prevent transmission to and subsequent display of received content.

Continuing the above-mentioned example (e.g., the email sent to fifty users of an email service), content simulator 110 determines that the received content (e.g., email) is a medium risk (e.g., because it contains a web link asking for personal information). As such, content simulator 110 can allow transmission of the message without the link (e.g., after deprecating the HREF tag, thus disabling the link).

Regardless of the validity determination (i.e., regardless of whether the received content is successfully or unsuccessfully validated), content simulator 110 converts the received content or otherwise changes the received content and generates a customized message for the user based on the user's profile. Continuing the above-mentioned example, (e.g., the email sent to fifty users of an email service), content simulator has identified and classified five users as wanting more technical information. Accordingly, content simulator 110 can generate and send the following message that includes a statement, "The link sent to you is removed because the link asked for sensitive personal data" as well as changing the received content by removing or deprecating the link. The remaining forty-five users were classified as not wanting technical information. Accordingly, content simulator 110 can generate and send the following message for the remaining forty-five users, "The link sent to you is removed because the link asked for your bank account details, sharing which could be dangerous."

In instances where content simulator 110 has determined that malicious links were embedded in the received content and the user's profile indicates a preference for technical information, content simulator 110 can generate a message stating, "The link sent to you is removed because the link would have taken you to a virus infected machine, sharing which could be dangerous. Conversely, a user whose preferences is non-technical information, content simulator 110 can generate a message stating, "The link sent to you removed because the link would have damaged your phone."

In other instances, content simulator 110 can further include other educational information for users wanting more technical information using a natural language processing module.

Figure 3:
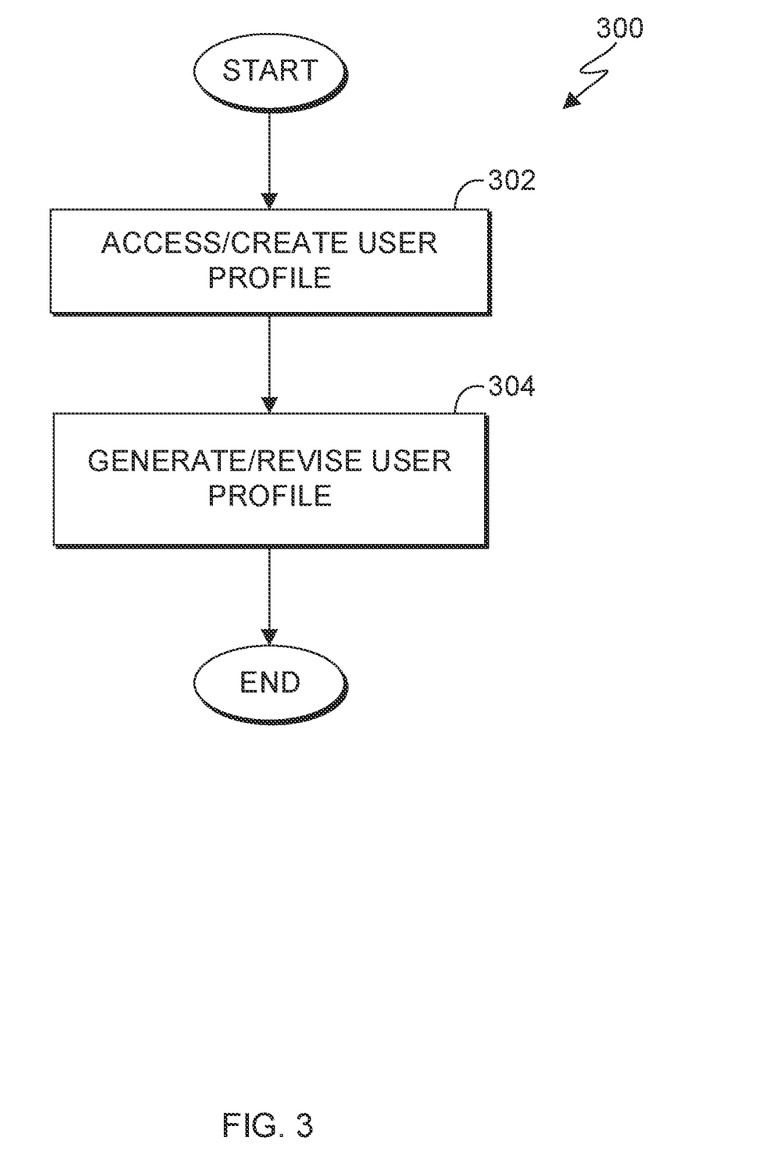
FIG. 3 is a flowchart depicting operational steps for creating and maintaining a user profile used to prevent unintended access to malicious content, in accordance with an embodiment of the present invention.

In instances where a user profile is not found (e.g., not created) or otherwise not available, content simulator 110 can create a user profile or revise the user's profile based on user activity as discussed in greater detail with regard to FIG. 3.

FIG. 3 is a flowchart 300 depicting operational steps for creating and maintaining a user profile used to prevent unintended access to malicious content, in accordance with an embodiment of the present invention.

In step 302, content simulator 110 accesses or creates a user profile. In this embodiment, content simulator 110 accesses a user profile from one or more stored databases (e.g., database 112). In other embodiments, content simulator 110 can access a respective user profile from one or more other components of computing environment 100.

In this embodiment, in instances where a user profile has not been created or is otherwise unavailable, content simulator 110 can create a user profile based on user activity. For example, content simulator 110 can, with permissioned access from the user (e.g., via an opt-in/opt-out mechanism), monitor user activity on one or more user devices to identify types of activity (e.g., content accessed) and applications (e.g., browsers, programs, etc.) used by the user, frequency of use by the user and other patterned user behavior (e.g., user defined terms, frequently used words, etc.).

In this embodiment, content simulator 110 can generate a score assigned to the user that can be used to indicate a user's technical preferences based on the user profile. For example, content simulator 110 can identify based on the user's activity and profile that the user may use a particular device infrequently (e.g., up to three times per week), sends typed or text content in frequently, and generally speaks and receive text in a particular language, content simulator 110 can assign the user a score indicating that the user may prefer less technical information and infrequent notifications. Conversely, content simulator 110 can assign the user a score indicate the user prefers or is open to receiving more technical information based on user activity that shows the user reading technical or educational content, navigation patterns through applications, frequency and duration of use. In other embodiments, content simulator 110 can directly receive user preferences.

In step 304, content simulator 110 revises the user profile. In this embodiment, content simulator 110 revises the created or accessed user profile iteratively using one or more machine learning algorithms to predict user preferences based on user activity. In this manner, a user can be classified can continually update the created user profiles and scores. For example, a user profile can be initially designated as preferring technical information and be updated to indicate a preference for non-technical information and vice versa.

Figure 4:
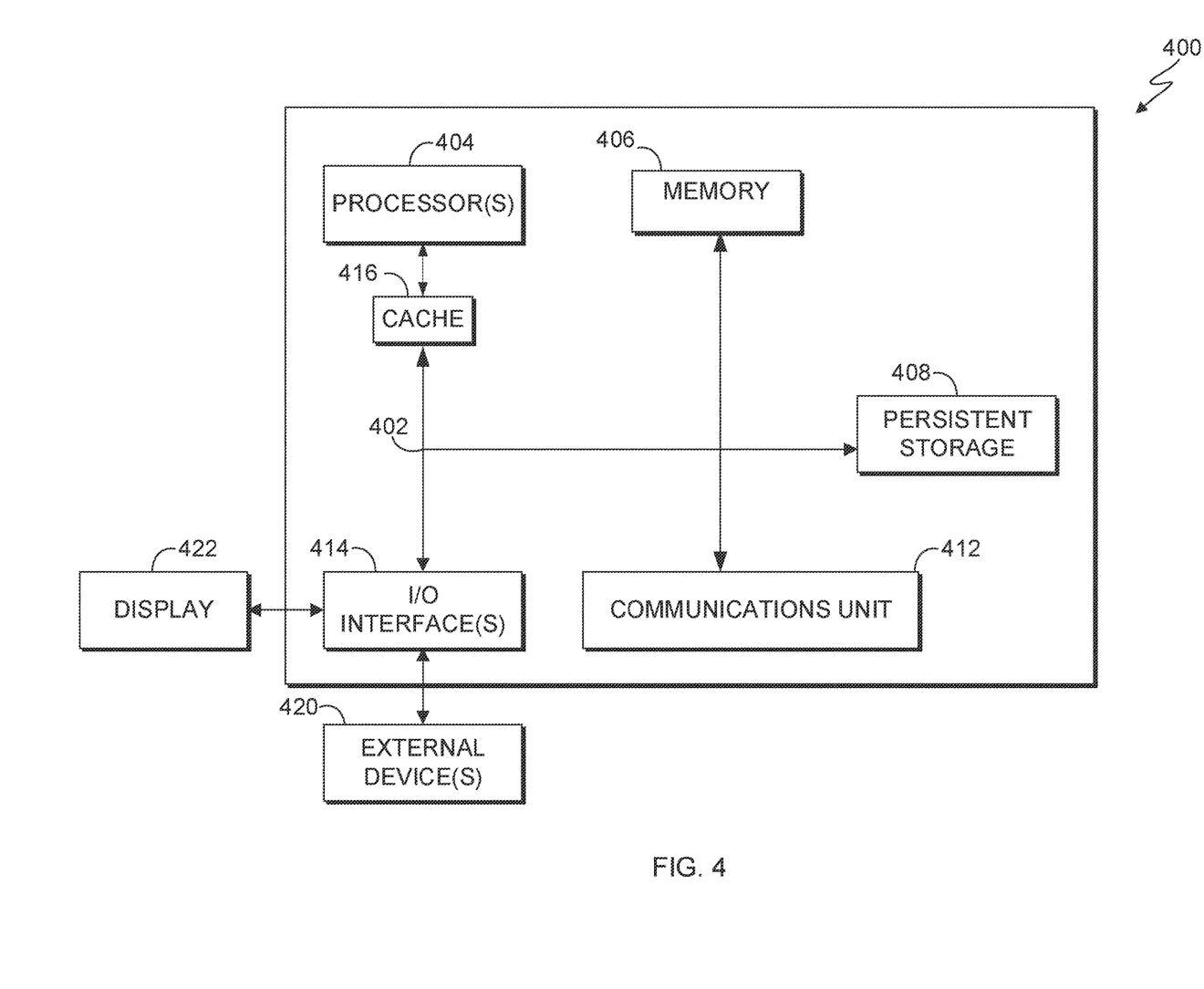
FIG. 4 is a block diagram of an example system, in accordance with an embodiment of the present invention.

FIG. 4 depicts a block diagram of components of computing systems within computing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Computer system 400 includes communications fabric 402, which provides communications between cache 416, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses or a crossbar switch.

Memory 406 and persistent storage 408 are computer readable storage media. In this embodiment, memory 406 includes random access memory (RAM). In general, memory 406 can include any suitable volatile or non-volatile computer readable storage media. Cache 416 is a fast memory that enhances the performance of computer processor(s) 404 by holding recently accessed data, and data near accessed data, from memory 406.

Content simulator 110 (not shown) may be stored in persistent storage 408 and in memory 406 for execution by one or more of the respective computer processors 404 via cache 416. In an embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Content simulator 110 may be downloaded to persistent storage 408 through communications unit 412.

I/O interface(s) 414 allows for input and output of data with other devices that may be connected to client computing device and/or server computer. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, e.g., content simulator 110, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
    in response to receiving content comprising one or more messages containing media, determining validity of received content, wherein determining validity of received content comprises:
        simulating web resources associated with objects in the received media to determine attributes of the web resources;
        validating web resources of the received media against a master database using one or more combinations of real time internet searches;
        identifying potential problems from the simulated web resources associated with objects in the received media,
        assigning a risk score to the received media based on the simulated web resources, the identified potential problems, and results of the one or more combinations of real time internet searches; and
    in response to determining the validity of received content, altering the received content by deprecating a received link associated with the received content and generating a customized message using a generated score that indicates technical preferences of the user based on patterned user behavior, user activity, and applications used by the user prior to transmitting the received content to the user.

2. The computer-implemented method of claim 1, wherein altering the received content prior to transmitting the received content to a user comprises:
    generating a score for one or more users intended to receive content based on respective user activity;
    classifying each of the one or more users intended to received content into respective categories for receiving information; and
    generating a customized message to attach to the received content based on the validity of the received content and the respective user classification.

3. The computer-implemented method of claim 2, wherein respective categories for receiving information includes technical and non-technical preferences.

4. The computer-implemented method of claim 2, further comprising:
    in response to an unsuccessful validation, deprecating received links embedded within received content.

5. The computer-implemented method of claim 2, further comprising:
    in response to an unsuccessful validation, tagging received content with details for future content forwarding.

6. The computer-implemented method of claim 2, further comprising:
    transmitting the generated customized message to attach to the received content based on the validity of the received content and the respective user classification.

7. A computer program product comprising:
    one or more computer readable storage media and program instructions stored on the one or more computer readable storage media, the program instructions comprising:
        program instructions to, in response to receiving content comprising one or more messages containing media, determine validity of received content, wherein the program instructions to determine validity of received content comprise:
            program instructions to simulate web resources associated with objects in the received media simulating web resources associated with objects in the received media to determine attributes of the web resources;

program instructions to validate web resources of the received media against a master database using one or more combinations of real time internet searches;

using one or more combinations of real time internet searches, program instructions to identify potential problems from the simulated web resources associated with objects in the received media, and program instructions to assign a risk score to the received media based on the simulated web resources, the identified potential problems, and results of the one or more combinations of real time internet searches; and program instructions to, in response to determining the validity of received content, alter the received content by deprecating a received link associated with the received content and generating a customized message-using a generated score that indicates technical preferences of the user based on patterned user behavior, user activity, and applications used by the user prior to transmitting the received content to the user.

8. The computer program product of claim 7, wherein the program instructions to determine validity of received content comprise program instructions to simulate the received content, server side.

9. The computer program product of claim 7, wherein the program instructions to altering the received content prior to transmitting the received content to a user comprise:

program instructions to generate a score for one or more users intended to receive content based on respective user activity;

program instructions to classify each of the one or more users intended to received content into respective categories for receiving information; and program instructions to generate a customized message to attach to the received content based on the validity of the received content and the respective user classification.

10. The computer program product of claim 9, wherein respective categories for receiving information includes technical and non-technical preferences.

11. The computer program product of claim 9, wherein the program instructions stored on the one or more computer readable storage media further comprise:

program instructions to, in response to an unsuccessful validation, deprecate received links embedded within received content.

12. The computer program product of claim 9, wherein the program instructions stored on the one or more computer readable storage media further comprise:

program instructions to, in response to an unsuccessful validation, tag received content with details for future content forwarding.

13. The computer program product of claim 9, wherein the program instructions stored on the one or more computer readable storage media further comprise:

program instructions to transmit the generated customized message to attach to the received content based on the validity of the received content and the respective user classification.

14. A computer system for comprising:
one or more computer processors;
one or more computer readable storage media; and program instructions stored on the one or more computer readable storage media for execution by at least one of the one or more computer processors, the program instructions comprising:

program instructions to, in response to receiving content comprising one or more messages containing media, determine validity of received content, wherein the program instructions to determine validity of received content comprise:

program instructions to simulate web resources associated with objects in the received media simulating web resources associated with objects in the received media to determine attributes of the web resources;

program instructions to validate web resources of the received media against a master database using one or more combinations of real time internet searches;

using one or more combinations of real time internet searches, program instructions to identify potential problems from the simulated web resources associated with objects in the received media, and program instructions to assign a risk score to the received media based on the simulated web resources, the identified potential problems, and results of the one or more combinations of real time internet searches; and program instructions to, in response to determining the validity of received content, alter the received content by deprecating a received link associated with the received content and generating a customized message-using a generated score that indicates technical preferences of the user based on patterned user behavior, user activity, and applications used by the user prior to transmitting the received content to the user.

15. The computer system of claim 14, wherein the program instructions to determine validity of received content comprise program instructions to simulate the received content, server side.

16. The computer system of claim 14, wherein the program instructions to altering the received content prior to transmitting the received content to a user comprise:

program instructions to generate a score for one or more users intended to receive content based on respective user activity;

program instructions to classify each of the one or more users intended to received content into respective categories for receiving information; and program instructions to generate a customized message to attach to the received content based on the validity of the received content and the respective user classification.

17. The computer system of claim 16, wherein respective categories for receiving information includes technical and non-technical preferences.

18. The computer system of claim 16, wherein the program instructions stored on the one or more computer readable storage media further comprise:

program instructions to, in response to an unsuccessful validation, deprecate received links embedded within received content.

19. The computer system of claim 16, wherein the program instructions stored on the one or more computer readable storage media further comprise:

program instructions to, in response to an unsuccessful validation, tag received content with details for future content forwarding.

20. The computer-implemented method of claim 1, wherein determining validity of received content by simulating web resources associated with objects in the received media using one or more combinations of real time internet searches comprises:
   validating results of the real time internet searches against a master database.

* * * * *